United States Patent [19]

Blackwood

[11] 3,969,951
[45] July 20, 1976

[54] TECHNIQUE FOR STRENGTHENING STEERING COLUMN SHIFT SOCKETS

[76] Inventor: Everett E. Blackwood, 205 Sabine Drive, Portland, Tex. 78374

[22] Filed: May 14, 1975

[21] Appl. No.: 577,154

[52] U.S. Cl. ............................ 74/473 SW; 29/402; 29/526; 29/401 R; 74/484 R; 403/11
[51] Int. Cl.² ..................... G05G 9/12; B23P 7/04
[58] Field of Search ............... 74/473 SW, 484, 485, 74/486; 29/401 R, 401 F, 402, 526; 403/11

[56] References Cited
UNITED STATES PATENTS

| | | | |
|---|---|---|---|
| 2,405,541 | 8/1946 | Gerner | 29/401 X |
| 3,410,150 | 11/1968 | Wieland et al. | 74/484 X |
| 3,491,613 | 1/1970 | Pellman | 74/484 |

Primary Examiner—Allan D. Herrmann
Attorney, Agent, or Firm—G. Turner Moller

[57] ABSTRACT

There is disclosed a technique for strengthening broken or unbroken steering column shift sockets comprising a strengthening sleeve secured to the boss and means connecting the sleeve to a shift lever. In the event the boss is broken, the end thereof is severed while shift socket is on the steering column before installation of the strengthening sleeve. In the situation of an unbroken boss the sleeve is merely slid over the unamputated end.

16 Claims, 5 Drawing Figures

TECHNIQUE FOR STRENGTHENING STEERING COLUMN SHIFT SOCKETS

Standard transmission vehicles typically comprise a steering column having a shift socket thereon which is rotated during movement of the shift lever. The shift lever typically extends generally radially into the shift socket through a boss. A secure connection is made between the boss and the shift lever by a pin extending transversely of the shift lever. The shift socket boss of certain makes and models of vehicles have the undesirable trait of breaking where the shift lever retaining pin is inserted through the boss. In this circumstance, the vehicle driver has, in his hand, an unconnected shift lever and is accordingly unable to manipulate the transmission and thereby change gears therein.

The technique presently used to restore the vehicle to driving condition is to replace the broken shift socket. This entails removal of the steering wheel, removal of the horn wiring, removal of the turn signal indicator wiring, removal of the broken shift socket, acquistion of a new shift socket, painting the new shift socket to match the steering column, replacing the shift socket, replacing the turn signal indicator wiring, replacing the horn wiring, replacing the steering wheel and reattaching the shift lever to the shift socket hub. Although this is not a major repair, the costs including parts and labor is at least $25 and probably closer to $35. As will become apparent more fully hereinafter, the practice of this invention allows repair of the shift socket at substantially less than half the replacement cost.

Disclosures of general interest are found in U.S. Pat. Nos. 2,136,679; 3,051,279; 3,354,534 and 3,462,144.

In summary, one aspect of this invention comprises a method of strengthing a steering column shift socket having a shift lever receiving boss comprising the steps of securing a sleeve about the boss, placing a shift lever through the sleeve in the boss, and securing the shift lever to the sleeve.

Another aspect of this inventin comprises a steering column comprising a repaired shift socket having an amputated pin retaining boss; a sleeve, secured about the boss, having a shift lever connecting section disposed beyond the end of the amputated boss; a shift lever disposed through the sleeve in the boss; and means connecting the shift lever to the connecting section.

Another aspect of this invention comprises a steering column shift socket repair sleeve including a body having an axially extending passage therethrough comprising a first section of first internal diameter for closely receiving the boss of a steering column shift socket and a second section of a second internal diameter less than the first diameter, a pair of aligned openings transverse to the axis through the body intersecting the passage in the second section for receiving a shift lever retaining pin and means extending through the first section for attaching the body to the shift socket boss.

Figure 1:
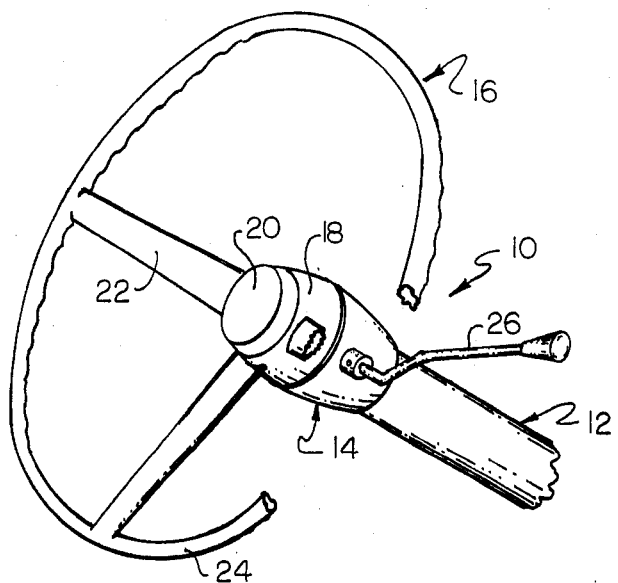
FIG. 1 is a broken isometric view of a steering column incorporating the principles of this invention.
Figure 3:
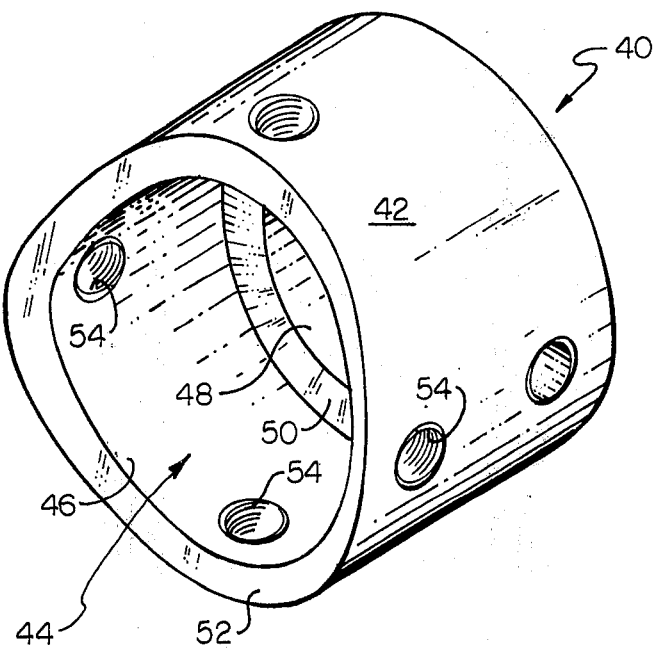
FIG. 3 is an isometric view of the shift socket repair sleeve illustrated in FIG. 2.

Referring to FIG. 1, there is illustrated a steering mechanism 10 of a standard transmission vehicle comprising a steering column 12, a shift socket 14 rotatably mounted on the column 12 and a steering wheel 16 comprising a hub 18, a horn 20, and a plurality of radially extending arms 22 extending from the hub 18 to a steering wheel rim 24. The steering mechanism 10 incorporates a shift lever 26 for manipulating the vehicular transmission in any suitable manner.

Figure 2:
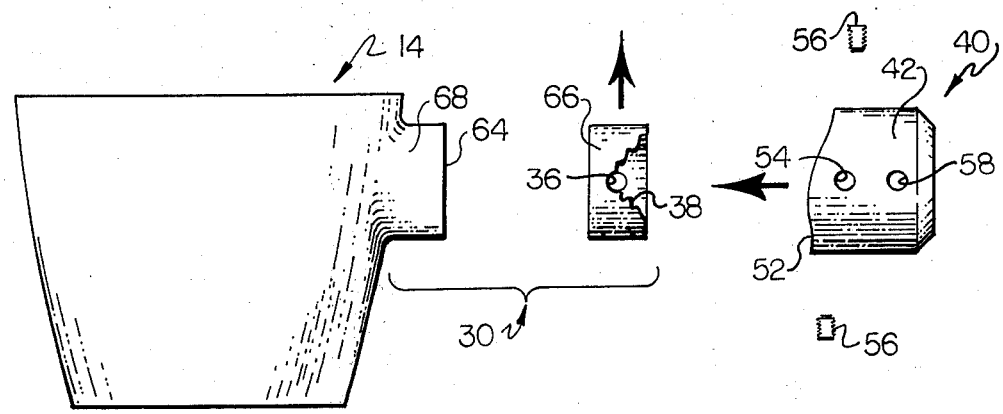
FIG. 2 is a side elevational view illustrating the severing and removal of a broken portion of a shift socket boss and also illustrating installation of a shift socket boss strengthening or repair sleeve.
Figure 4:
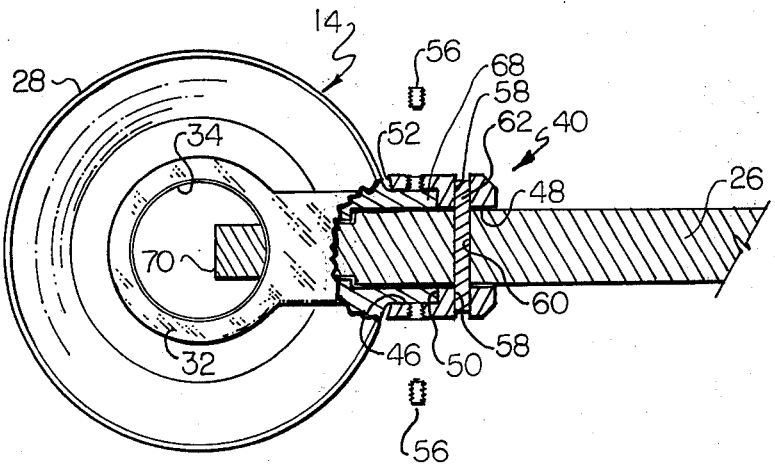
FIG. 4 is a top view, partially in section, illustrating the installation of the repair sleeve of this invention.

Referring to FIGS. 2 and 4, the shift socket 14 comprises an external generally frusto-conical outer wall 48 from which radially extends a boss or hub 30 into which the shift lever 26 extends. The shift socket 14 comprises a central section 32 having a passage 34 therein for receiving a shift tube (not shown) which receives the end of the shift lever 26 in a conventional manner.

The shift lever 26 extends into the boss 30 and is captivated thereto by a pin extending through a pair of transverse openings 36 as suggested in FIG. 2. As mentioned previously, one difficulty experienced in shift mechanisms of this type is that the boss 30 will break out along a fracture line 38 thereby releasing the shift lever retaining pin from the holes 36. Accordingly, the shift lever 26 is disabled and the driver cannot manipulate the vehicular transmission.

Rather than replacing the shift socket 14, there is provided a repair sleeve or collar 40 which is installed on the shift socket 14 while leaving the shift socket 14 attached to the steering column 12. The sleeve 40 comprises a body 42 desirably of metal having an axially extending passage 44 therethrough comprising a first passage section 46 and a second passage section 48 of lesser diameter leaving a shoulder 50 on the inside of the body 42. The end 52 closest to the shift socket 14 is desirably of complex configuration in order to closely fit adjacent the outer wall 28.

Although any suitable means may be provided for securing the sleeve 40 to the boss 30, the body 42 may provide a plurality of threaded openings 54 for receiving a like plurality of set screws 56. A desirable advantage afforded by the complex configuration of the end 52 is to allow placement of the threaded openings 54 as close as possible to the base of the boss 30. It will accordingly be seen that the portion of the sleeve 40 nearest the base of the boss 30 comprises a section for anchoring the sleeve 40 to the base 30. It will likewise be apparent that any other suitable means may be provided for securing the sleeve 40 to the base 30 including, but not limited to, screws threaded into the boss 30, glue, solder and the like.

Extending through the sleeve body 42 and intersecting the second passage section 48 are a pair of aligned openings 58 disposed in a connecting section of the sleeve 40. During installation of the shift lever 26, the openings 58 are aligned with an opening 60 through the shift lever 26 in order to receive a pin 62 for securing the shift lever 26 to the sleeve 40. It will accordingly be seen that the shift lever 26 is attached to the sleeve 40 which is in turn attached to the amputated portion of the boss 30.

In repairing a broken shift socket in which one or both of the shift lever pin retaining holes 36 have been broken out, as along fracture lines 38, the repairman severs the boss 30 along a line 64 as by the use of a hacksaw or other suitable device thereby cutting away the broken portion 66 of the boss 30 and leaving an amputated portion 68. The broken portion 66 is then discarded. The repair sleeve 40 is then connected to the shift lever 26 by passing the pin 62 through the aligned openings 58, 60. The shift lever 26 is then inserted into the amputated boss portion 68 so that the terminal end 70 of the shift lever 26 engages the transmission shift tube (not shown) in a conventional manner. The set screws 56 are then advanced through the threaded openings 54 into securing engagement with the amputated boss portion 68. It will accordingly be apparent that the shift socket 14 has been repaired without removing the same from the steering column 12 thereby avoiding much of the time and effort now expended in replacing broken shift sockets.

In the alternative, the repair sleeve 40 may be inserted on and secured to the amputated boss portion 68 followed by insertion of the shift lever 26 and placement of the pin 62.

As heretofore described, the strengthening sleeve 40 of this invention has been used to repair a broken shift socket. It may be desirable, under certain circumstances, to strengthen the boss 30 of the shift socket 14 rather than wait for the boss 30 to fail. If desirable, the end of the boss 30 may be severed along the line 64 and the strengthening sleeve 40 inserted over the amputated boss portion 68.

Figure 5:
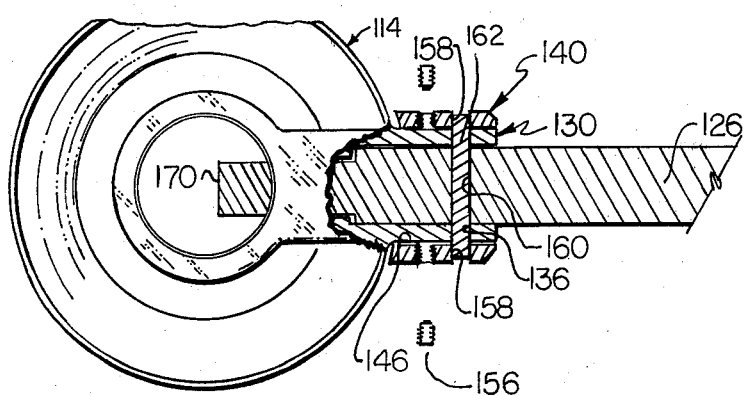
FIG. 5 is a view similar to FIG. 4 illustrating the positioning of a strengthening sleeve about the boss of an unbroken shift socket.

Referring to FIG. 5, there is illustrated a technique for strengthening an unbroken shift socket without requiring amputation of a portion of the shift lever receiving boss. For purposes of brevity, analogous elements are referred to with analogous reference characters with only the differences between the embodiments of FIGS. 4 and 5 being specifically discussed. As is apparent from FIG. 5, the boss 130 is unbroken and is surrounded by a strengthening sleeve 140. The strengthening sleeve 140 differs from the sleeve 40 only in that the passage 146 therethrough is of substantially uniform diameter so that the openings 158 in the sleeve 140 may be aligned with the openings 136, 160 in the unamputated boss 130 and shift lever 126 respectively.

When it is desired to utilize the strengthening sleeve 140, it is necessary only to remove the pin connecting the boss 130 and the shift lever 126, remove the shift lever 126 from the boss 130, slide the sleeve 140 over the boss 130, reinsert the shift lever 126 in the boss 130, place the pin 162 through the aligned openings 158, 136, 160 and advance the set screws 156 into securing engagement with the boss 130.

It will accordingly be seen that there is provided a technique for repairing and/or strengthening a broken shift socket while leaving the same attached to a steering column.

I claim:

1. A method of strengthening a steering column shift socket having a shift lever receiving boss comprising the steps of securing a sleeve about the boss;
placing a shift lever through the sleeve in the boss; and
securing the shift lever to the sleeve.

2. The method of claim 1 further comprising the step of severing an end portion from the remainder of the boss prior to securing the sleeve about the boss.

3. The method of claim 2 wherein the severing step is conducted while leaving the shift socket on the steering column.

4. The method of claim 1 wherein the securing step is conducted while leaving the shift socket on the steering column.

5. A method of repairing a steering column shift socket having a fractured shift lever retaining boss comprising the steps of severing the fractured portion from the remainder of the boss;
securing a sleeve about the remainder of the boss;
placing a shift lever through the sleeve and the boss; and
securing the shift lever to the sleeve.

6. The method of claim 5 wherein the severing and securing steps are conducted while the shift socket is connected to the steering column.

7. The method of claim 6 wherein the sleeve provides a shift lever connecting section and wherein the first securing step comprises disposing the connecting section beyond the severed end of the boss; and
the second securing step comprises securing the connecting section to the shift lever.

8. The method of claim 7 wherein the shift lever connecting section comprises a pin receiving opening therethrough and wherein the securing step comprises placing a pin through the pin receiving opening and the shift lever.

9. A steering column comprising a repaired shift socket having an amputated pin retaining boss;
a sleeve, secured about the boss, having a shift lever connecting section disposed beyond the end of the amputated boss;
a shift lever disposed through the sleeve in the boss; and
means connecting the shift lever to the connecting section.

10. The steering column of claim 9 wherein the connecting means comprises a pin extending through the connecting section and the shift lever.

11. The steering column of claim 9 comprising threaded members securing the sleeve to the boss.

12. The steering column of claim 9 wherein the shift socket comprises an exterior wall of generally frustoconical configuration and the boss is generally radially extending therefrom;
the sleeve comprises an end of complex configuration closely following the trace of the exterior wall.

13. The steering column of claim 12 comprising threaded members extending through the sleeve adjacent the complex configured end thereof.

14. A steering column shift socket repair sleeve comprising a body having an axially extending passage therethrough comprising a first section of first internal diameter for closely receiving the boss of a steering column shift socket and a second section of second internal diameter less than the first diameter, a pair of aligned openings transverse to the axis through the body intersecting the passage in the second section for receiving a shift lever retaining pin and means for attaching the body to the shift socket boss.

15. The steering column shift socket repair sleeve of claim 14 wherein the body is metallic.

16. The steering column shift socket repair sleeve of claim 14 wherein the attaching means comprises threaded openings in the body extendng into the first passage section.

* * * * *